United States Patent [19]

Okubo

[11] Patent Number: 5,123,715
[45] Date of Patent: Jun. 23, 1992

[54] ESTIMATING ROAD FRICTION COEFFICIENT

[75] Inventor: Satomi Okubo, Saitama, Japan

[73] Assignees: Akebono Brake Industry Co., Ltd., Tokyo; Akebono Research and Development Centre Ltd., Hanyu, both of Japan

[21] Appl. No.: 654,779

[22] Filed: Feb. 13, 1991

[30] Foreign Application Priority Data

Feb. 16, 1990 [JP] Japan .................................. 2-33812

[51] Int. Cl.$^5$ ............................................. B60T 8/66
[52] U.S. Cl. .................................. 303/108; 303/105; 303/103; 364/426.02
[58] Field of Search ............... 303/103, 105, 108, 109; 364/426.02, 426.03, 426.04

[56]  References Cited

U.S. PATENT DOCUMENTS

| 4,321,677 | 3/1982 | Takahashi | 364/426.02 |
| 4,384,330 | 5/1983 | Matsuda | 303/109 |
| 4,693,522 | 9/1987 | Wapper | 303/106 |
| 4,825,367 | 8/1989 | Nagaoka | 364/426.03 |
| 4,855,917 | 8/1989 | Sawano | 303/103 |
| 4,883,325 | 11/1989 | Shimanuki | 303/108 |
| 5,033,799 | 7/1991 | Braschel | 303/109 |

Primary Examiner—Joseph F. Peters, Jr.
Assistant Examiner—Christopher P. Ellis
Attorney, Agent, or Firm—Cushman, Darby & Cushman

[57]  ABSTRACT

A road surface friction coefficient estimating method and apparatus in an anti-lock control device for preventing locking of vehicle wheels during braking. The road surface friction coefficient is estimated by comparing a deceleration of an estimated vehicle speed with a predetermined threshold value. The predetermined threshold value has different road surface friction coefficient values corresponding to different vehicle deceleration values. The braking hydraulic pressure is then repeatedly varied in accordance with signals indicative of the estimated road surface friction coefficient, signals indicative of the estimated vehicle speed, and one of the signals indicative of the slowest rear wheel speed and the front wheel speeds.

10 Claims, 3 Drawing Sheets

ESTIMATING ROAD FRICTION COEFFICIENT

BACKGROUND OF THE INVENTION

The present invention relates to an anti-lock control method for preventing locking of automotive wheels of a running vehicle, and, more particularly, to a method and apparatus for estimating a coefficient of friction between a road surface and wheels that are anti-lock controlled.

Generally, in an anti-lock control apparatus for automotive vehicles, to maintain steering ability and running stability during braking, a control unit including a micro-computer which controls brake hydraulic pressure. This brake pressure control also reduces braking distance.

During operation of the anti-lock control apparatus, a control mode for brake hydraulic pressure is determined based on an electric signal indicative of a wheel speed. This wheel speed is detected by a wheel speed sensor. According to the control mode, a hold valve, which is a normally opened solenoid valve, and a decay valve, which is a normally closed solenoid valve, are selectively opened and closed to increase, hold constant and decrease the brake hydraulic pressure.

In such anti-lock control, in many cases the control is performed by the steps of setting a target slip rate for braking, detecting a difference between an actual wheel speed (hereinafter referred as the wheel speed) and a target speed which is a wheel speed calculated from the target slip rate, and determining the required increase or decrease of the brake hydraulic pressure based on this detected difference and acceleration/deceleration of the wheel speed. Therefore, the wheel speed is rapidly converged to the target speed.

However, since the wheel speed varies due to slight changes on a road surface, the above-mentioned anti-lock control suffers from problems such that the decrease and increase of the brake hydraulic pressure is undesirably repeated many times due to the effect of the change on the road surface. As a result, much time is required to converge the wheel speed to the target speed. Also, the period in which a braking force is insufficient is extended because the brake hydraulic pressure is not rapidly and suitably increased. Thus, the braking distance increases and the deceleration of the vehicle is insufficient.

SUMMARY OF THE INVENTION

It is an object of the present invention to solve the above-mentioned problems.

In order to attain the above-noted and other objects, the present invention provides a method and apparatus for estimating a road surface friction coefficient $\mu$ in an anti-lock control for preventing the locking of vehicle wheels during braking. This is accomplished by repeatedly increasing and decreasing the braking hydraulic pressure in response to electric signals.

The estimating method comprises the steps of setting an estimated vehicle speed based on wheel speeds, setting at least one threshold value representing a predetermined road surface friction coefficient $\mu$, calculating a deceleration of said estimated vehicle speed, and comparing the deceleration with the threshold value for estimating said road surface friction coefficient $\mu$.

In the road friction coefficient estimating apparatus, wheel speed sensing devices detect the speeds of all the wheels and output signals indicative thereof. These wheel speed signals are transmitted to an estimating circuit which determines the highest speed of all the wheels and outputs an estimated vehicle speed signal which is transmitted to control logic circuits and a road surface friction coefficient judgment circuit.

The road surface friction coefficient judgment circuit receives the estimated vehicle speed signal and calculates a vehicle deceleration based on the decrease in the estimated vehicle speed during a predetermined time period. The judgment circuit then compares this calculated deceleration to reference decelerations to determine an estimated road surface friction coefficient and transmits signals indicative of this estimated road surface friction coefficient to the control logic circuits.

Concurrently, the wheel speed signals representing the front wheel speeds are transmitted directly to some of the control logic circuits. Also, the wheel speed signals representing the rear wheel speeds are transmitted to a selection circuit which determines the lowest of the rear wheel speeds and transmits signals indicative of this lowest speed to one of the control logic circuits not receiving signals representing the front wheel speeds.

Based on the estimated road surface friction coefficient signals, the estimated vehicle speed signals and either the front wheel speed signals or, the lowest rear wheel speed signal, the control logic circuits then control the opening and closing of hold valves and decay valves. These valves control the brake hydraulic pressure and thus control the braking of the vehicle.

DETAILED DESCRIPTION OF THE PREFERRED EMBODIMENTS

Preferred embodiments of the present invention will now be described with reference to the accompanying drawings.

Figure 1:
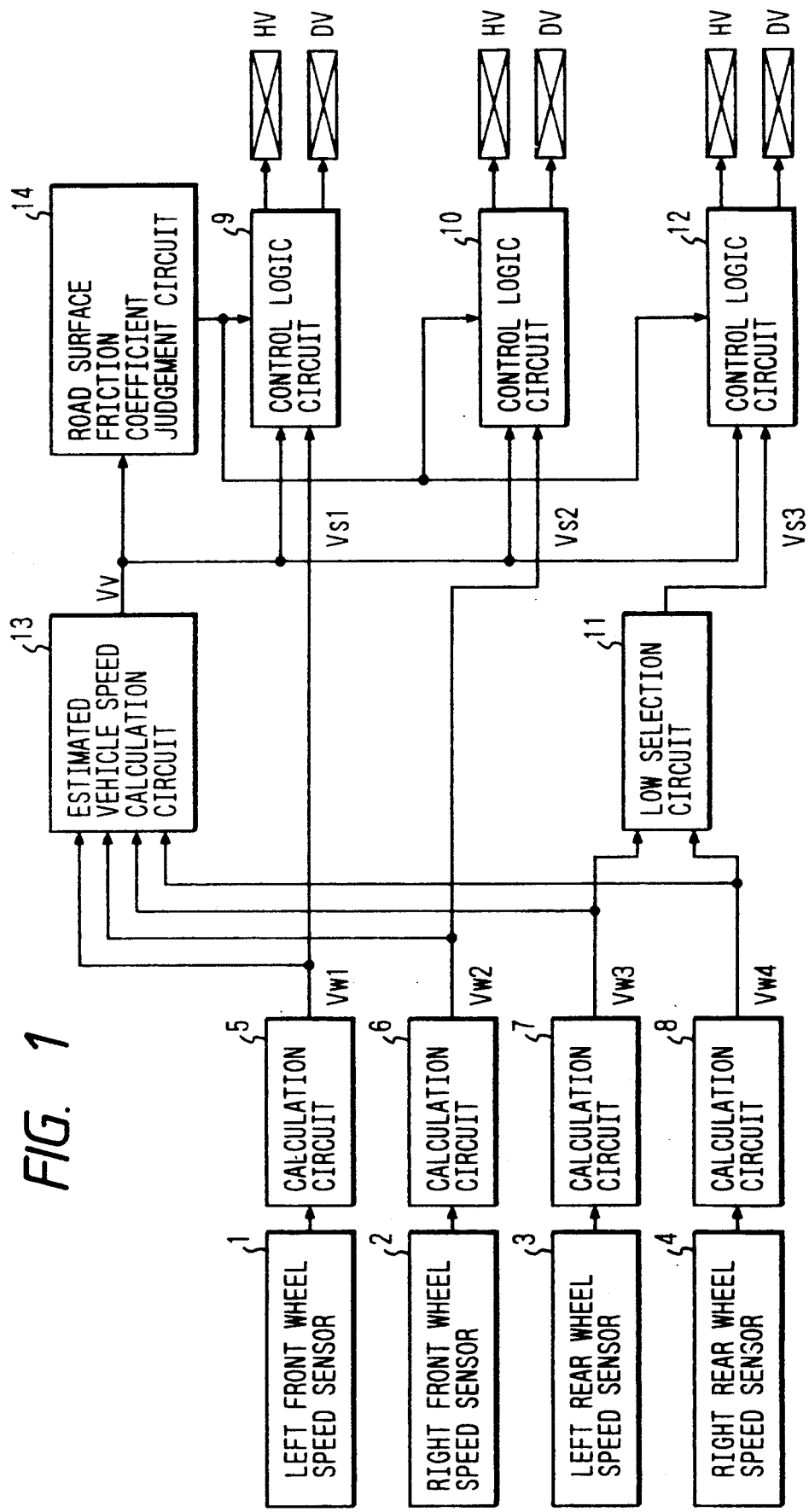
FIG. 1 is a block diagram showing a three-channel anti-lock control apparatus for practicing the present invention.

FIG. 1 is a block diagram showing a three-channel anti-lock control apparatus for practicing the present invention.

Output signals provided by wheel sensors 1 to 4 are transmitted to calculation circuits 5 to 8, respectively. These output signals are indicative of the wheel speeds as detected by wheel sensors 1 to 4, respectively. The right front wheel speed signal Vw1 and the left front wheel speed signal Vw2 are directly transmitted as first and second system speed signals Vs1 and Vs2 to first and second control logic circuits 9 and 10, respectively. A lower rear wheel speed is selected between the left rear wheel speed signal Vw3 and the right rear wheel speed signal Vw4 in a low-selection circuit 11. This lower rear wheel speed is transmitted as a third system speed signal Vs3 to a third control logic circuit 12. Each of the control logic circuits 9, 10 and 12 treats the respective system speed signals Vs1, Vs2 or Vs3 as a controlled object. In accordance with the respective system speed signals Vs1, Vs2 and Vs3 which are indicative of the wheel speeds, each of the control logic circuits controls the opening and closing of the hold valve HV and the decay valve DV.

The signals representing the wheel speeds Vw1 to Vw4, respectively, are also transmitted to an estimated vehicle speed calculation means 13. In the estimated wheel speed calculation means 13, the highest wheel speed is selected from among the four wheel speeds Vw1 to Vw4 and an estimated vehicle speed Vv is obtained with a limitation of acceleration/deceleration of ±1G which is the limitation of the wheel with the highest speed. The estimated vehicle speed Vv is output to the control logic circuits 9, 10 and 12.

The estimated vehicle speed Vv obtained by the calculation circuit 13 is also provided to a road surface friction coefficient $\mu$ judgment circuit 14. Signals indicative of the road surface friction coefficient $\mu$ as determined by the judgment circuit 14 are output to the control logic circuits 9, 10 and 12. In accordance with these signals, each of the control logic circuits 9, 10 and 12 determines a pressure increase rate from a point at which the brake hydraulic pressure starts to increase.

Figure 2:
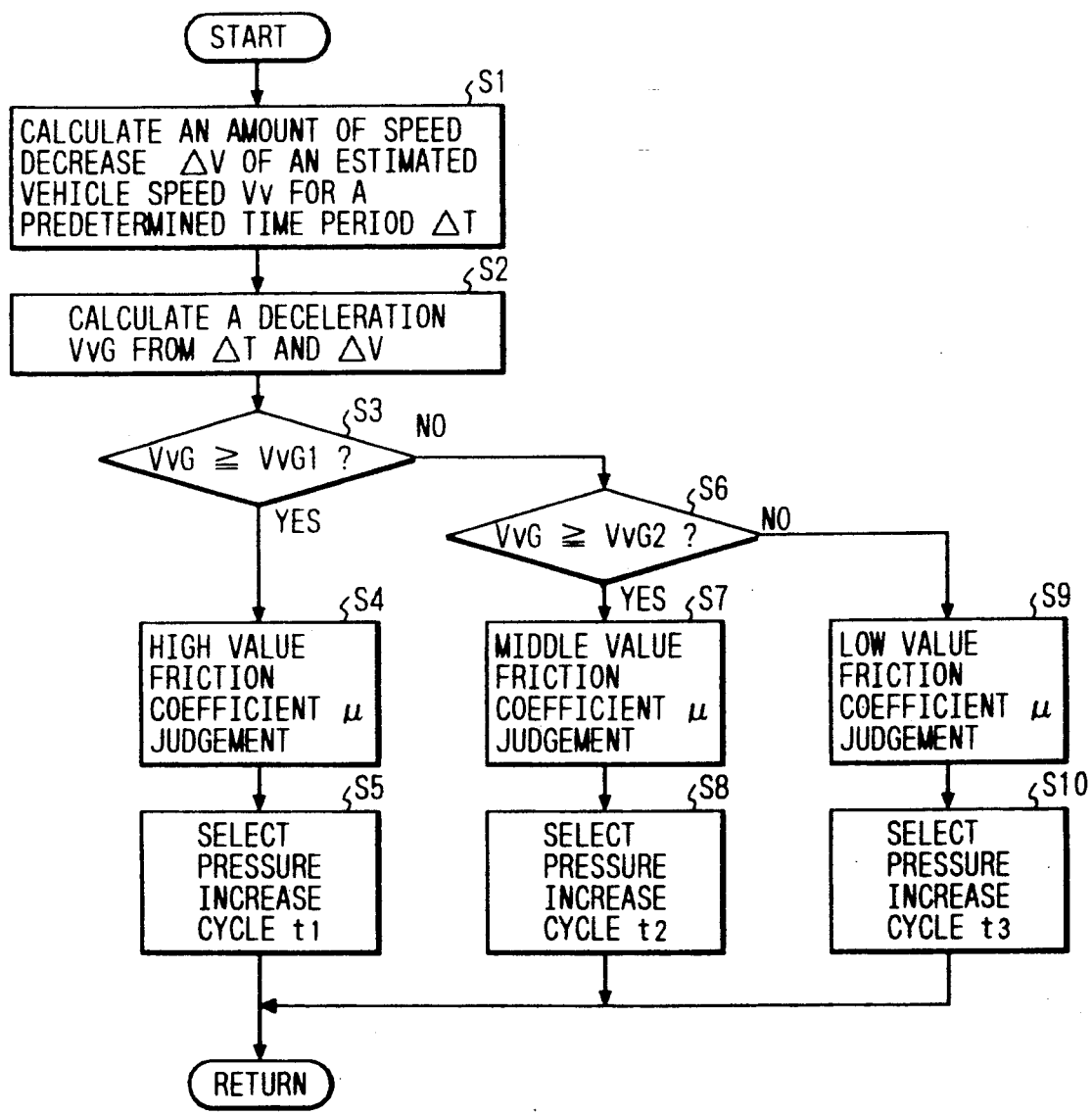
FIG. 2 is a flow chart showing the steps for determining a pressure increase rate.
Figure 3:
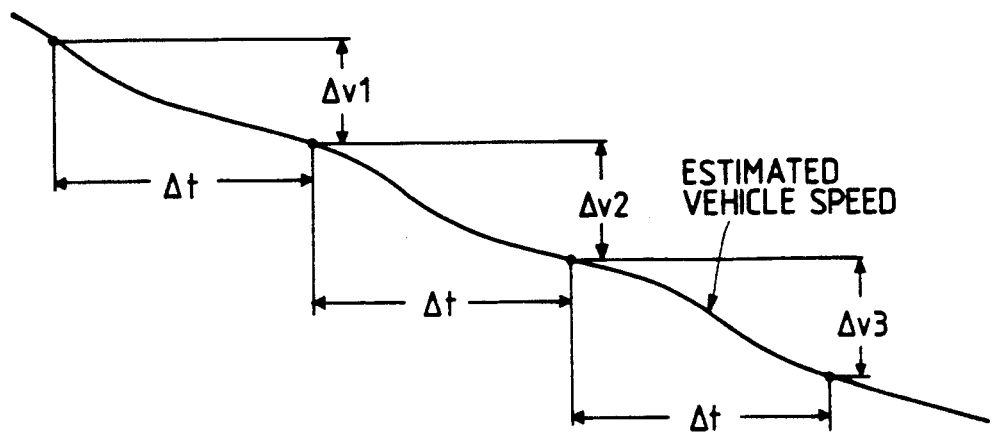
FIG. 3 is an explanatory diagram for a method of judging a road surface friction coefficient $\mu$.

FIG. 2 shows a flow chart indicating a routine in which the pressure increase rate is determined in accordance with the signals indicative of the road surface friction coefficient $\mu$ provided by the road surface friction coefficient $\mu$ judgment circuit 14 (hereinafter judgment circuit 14). The flow chart shown in FIG. 2 will now be explained with reference to FIGS. 3 and 4.

In Step S1, an amount of speed decrease $\Delta V$ of the estimated vehicle speed Vv for a predetermined time period $\Delta T$ is calculated by the judgment circuit 14. In Step S2, a deceleration VvG ($=\Delta V/\Delta T$) of the estimated vehicle speed Vv is also calculated by the judgment circuit 14. In Step S3, judgment circuit 14 determines whether or not the deceleration VvG is equal to or greater than the predetermined first reference deceleration VvG1.

If it is determined in Step S3 that the deceleration VvG is equal to or greater than the first reference deceleration VvG1 (VvG $\geq$ VvG1), in Step S4, the road surface friction coefficient $\mu$ is determined to be a high value and the judgment circuit 14 provides signals indicative thereof. In Step S5, the control logic circuits 9, 10 and 12 compare the road surface friction coefficient $\mu$ signals with the estimated vehicle speed signals Vv and the system speed signals Vs1, Vs2 and Vs3, respectively. The control logic circuits 9, 10 and 12, in accordance with the outcome of the above comparison, control the opening and closing of the hold valves HV and decay valves DV and thus perform the pressure increase by the shortest pressure increase cycle t1. This pressure increase cycle t1 is predetermined for the high valued road surface friction coefficient $\mu$ (shown in FIG. 4).

Figure 4:
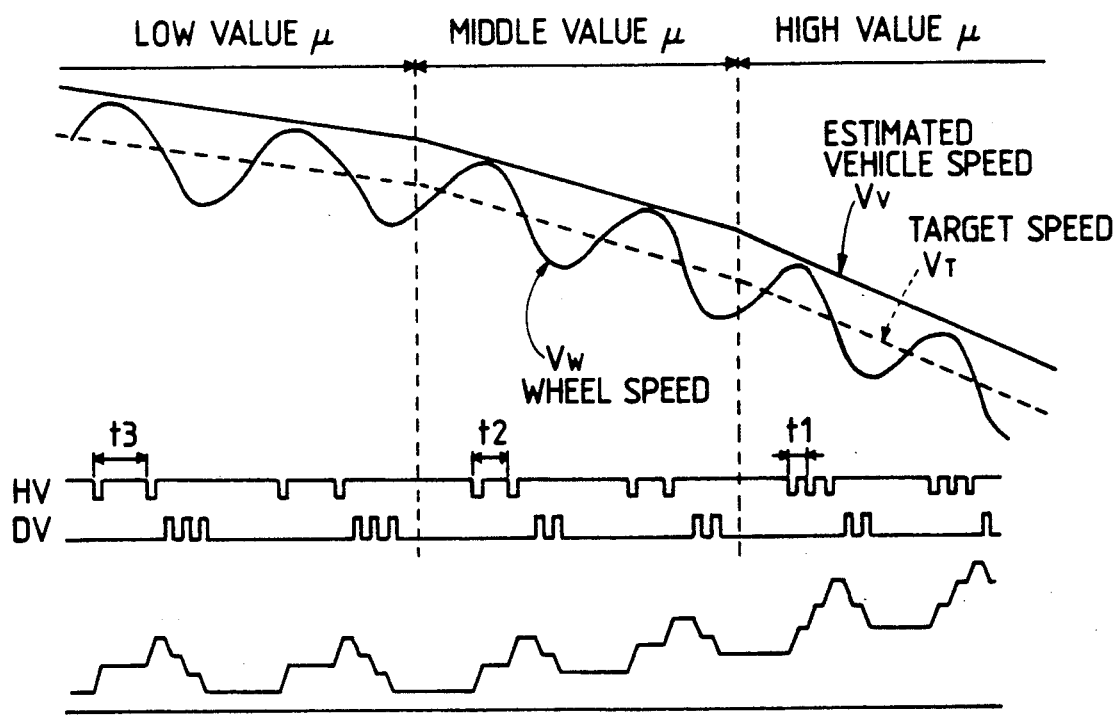
FIG. 4 is a diagram showing a control state in the anti-lock control according to the present invention.

In the embodiment of the present invention, as is apparent from FIG. 4, one pressure increase cycle is defined by one unit comprising a combination of a pressure increase period and a pressure hold period. During a pressure increase cycle, the brake hydraulic pressure is increased in steps by repetition of the pressure increase period and pressure hold period. The pressure increase cycle is varied such that the pressure hold period is changed while the pressure increase period is kept constant.

If in Step S3 the judgment circuit 14 determines that the deceleration VvG is less than the first reference deceleration VvG1 (VvG < VvG1), then in Step S6, the judgment circuit 14 determines whether or not the deceleration VvG is equal to or greater than a predetermined second reference deceleration VvG2. This second reference deceleration VvG2 is less than the first reference VvG1 (VvG2 < VvG1).

If the judgment circuit 14 determines in Step S6 that the deceleration VvG is equal to or greater than the second reference deceleration VvG2 (VvG $\geq$ VvG2), then in Step S7 the judgment circuit 14 determines the road surface friction coefficient $\mu$ to be a middle valued road surface friction coefficient $\mu$.

In Step S8, the control logic circuits 9, 10 and 12 compare the road surface friction coefficient $\mu$ signals with the estimated vehicle speed signals Vv and the system speed signals Vs1, Vs2 and Vs3, respectively. The control logic circuits 9, 10 and 12, in accordance with the outcome of the above comparison, control the opening and closing of the hold valves HV and decay valves DV and thus perform the pressure increase by a pressure increase cycle t2 (t2 > t1). This pressure increase cycle t2 is predetermined for the middle valued road surface friction coefficient $\mu$ (shown in FIG. 4).

On the other hand, if the judgment circuit 14 determines in Step S6 that the deceleration VvG is less than the second reference deceleration VvG2 (VvG < VvG2), in Step 9, the judgment circuit 14 determines the road surface friction coefficient $\mu$ to be low valued.

In Step S10, the control logic circuits 9, 10 and 12 compare the road surface friction coefficient $\mu$ signals with the estimated vehicle speed signals Vv and the system speed signals Vs1, Vs2 or Vs3, respectively. The control logic circuits 9, 10 and 12, in accordance with the outcome of the above comparison, control the opening and closing of the hold valves HV and decay valves DV and thus perform the pressure increase by a pressure increase cycle t3 (t3 > t2). This pressure increase cycle t3 is predetermined for the low valued road surface friction coefficient $\mu$ (shown in FIG. 4).

Accordingly, based on a selected one of the pressure increase cycles t1, t2 and t3, a pressure increase rate is determined for the wheels which are anti-lock controlled.

As is apparent from the above explanation, a plurality of pressure increase rates are set in advance according to various road surface friction coefficients $\mu$. The friction coefficients $\mu$ are determined on the basis of an amount of vehicle speed deceleration occurring during braking of the vehicle and one of the pressure increase rates is selected based on this determination. Then, the brake hydraulic pressure is increased by the selected pressure increase rate. As a result, it is possible not only to prevent excessive pressure increase of the brake hydraulic pressure on a road surface having a low friction coefficient $\mu$ but also to rapidly cope with the circumstance when the road surface friction coefficient $\mu$ changes from a low to high value during braking. Therefore, braking distance is reduced.

Because the road surface friction coefficient $\mu$ is determined on the basis of vehicle deceleration, no problem exist whereby the pressure increase rate is not suitable for the road surface due to the fact that the wheel speed variably changes with slight changes on a road surface. Accordingly, it is possible to reduce the time to converge the wheel speed to the target speed and therefore providing more stable anti-lock control.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An anti-lock control method of preventing locking of vehicle wheels during braking, said method comprising the steps of:
   setting an estimated vehicle speed based on a highest wheel speed among wheel speeds of all said vehicle wheels;
   setting at least one threshold value each representing a predetermined road surface friction coefficient;
   calculating a deceleration of said estimated vehicle speed;
   estimating said road surface friction coefficient by comparing said deceleration with each of said threshold values and obtaining an estimated road surface friction coefficient; and
   repeatedly varying braking hydraulic pressure in accordance with electric signals indicative of a value of said estimated road surface friction coefficient.

2. The method according to claim 1, wherein said deceleration calculating step includes the steps of:
   setting a predetermined time period;
   calculating a speed difference between said estimated vehicle speed at a beginning and end of said predetermined time period during braking; and
   calculating said deceleration by dividing said speed difference by said predetermined time period.

3. The method according to claim 1, wherein the step of repeatedly varying braking hydraulic pressure further comprises the steps of:
   setting a plurality of pressure increase rates for increasing said brake hydraulic pressure; and
   selecting one of said plurality of pressure increase rates in accordance with the value of said estimated road surface friction coefficient.

4. The method according to claim 3, wherein each of said plurality of pressure increase rates is defined by a time period in which said brake hydraulic pressure is increased and a respective time period in which said brake hydraulic pressure is held constant.

5. An anti-lock control device for preventing locking of vehicle wheels during braking, said anti-lock control device comprising:
   a plurality of detecting means for detecting wheel speeds and providing wheel speed signals indicative thereof;
   first circuit means for determining a slowest rear wheel speed from said wheel speed signals indicative of speeds of rear wheels and providing a slowest rear wheel speed signal indicative thereof;
   second circuit means for determining a fastest wheel speed from said signals provided by said plurality of detecting means and providing a vehicle speed signal indicative of said fastest wheel speed;
   third circuit means for calculating a vehicle deceleration in accordance with said vehicle speed signal and comparing said vehicle deceleration with predetermined vehicle decelerations to obtain an estimated road surface friction coefficient, said third circuit means providing an estimated road surface friction coefficient signal indicative of said estimated road surface friction coefficient;
   a plurality of fourth circuit means for providing brake pressure control signals in accordance with said vehicle speed signal, said estimated road surface friction coefficient signal, and one of said slowest rear wheel speed signal and said wheel speed signals.

6. A method of estimating a road surface friction coefficient for a running vehicle being braked, comprising the steps of:
   setting an estimated vehicle speed based on wheel speeds of said running vehicle;
   setting at least one threshold value each representing a predetermined road surface friction coefficient;
   calculating a deceleration of said estimated vehicle speed; and
   estimating said road surface friction coefficient by comparing said deceleration with each of said threshold values and obtaining an estimated road surface friction coefficient.

7. The method according to claim 6, wherein said deceleration calculating step includes the steps of:
   setting a predetermined time period;
   calculating a speed difference between said estimated vehicle speed at a beginning and end of said predetermined time period during braking; and
   calculating said deceleration by dividing said speed difference by said predetermined time period.

8. The method according to claim 6, wherein said method is adapted to be used for an anti-lock control system for preventing locking of wheels of said running vehicle, said anti-lock system comprising means for repeatedly varying braking hydraulic pressure in accordance with electric signals indicative of a value of said estimated road surface friction coefficient.

9. The method according to claim 8, wherein said means for repeatedly varying braking hydraulic pressure further comprises:
   means for setting a plurality of pressure increase rates for increasing said brake hydraulic pressure; and
   means for selecting one of said plurality of pressure increase rates in accordance with the value of said estimated road surface friction coefficient.

10. The method according to claim 9, wherein each of said plurality of pressure increase rates is defined by a time period in which said brake hydraulic pressure is increased and a respective time period in which said brake hydraulic pressure is held constant.

* * * * *